United States Patent [19]

Patane

[11] Patent Number: 4,724,640

[45] Date of Patent: Feb. 16, 1988

[54] STORAGE FACILITY

[76] Inventor: Fred Patane, R.D. #3, Box 207cc, Sewell, N.J. 08080

[21] Appl. No.: 585,722

[22] Filed: Mar. 2, 1984

[51] Int. Cl.$^4$ .............................................. E04H 6/34
[52] U.S. Cl. ..................................... 52/234; 52/236.3; 52/646; 52/645; 52/648; 414/267
[58] Field of Search ................ 52/236.3, 30, 36, 40, 52/646, 648, 645, 726, 263, 234; 211/191, 150, 190, 151; 414/267, 276; 108/57.1, 51 R

[56] References Cited

U.S. PATENT DOCUMENTS

| | | | |
|---|---|---|---|
| 3,233,374 | 2/1966 | Micheels et al. | 52/234 |
| 3,393,646 | 7/1968 | Giacobe | 108/57.1 X |
| 3,561,608 | 2/1971 | Weider | 211/191 |
| 3,620,353 | 11/1971 | Fosler | 198/809 |
| 3,687,312 | 8/1972 | Weir | 414/267 |
| 3,757,967 | 9/1973 | Colbridge | 211/191 |
| 3,894,373 | 7/1975 | Willingham | 52/236.3 |
| 3,930,573 | 1/1976 | Wyman | 198/809 |
| 3,933,257 | 1/1976 | Weber | 414/267 X |
| 4,124,123 | 11/1978 | Armington et al. | 211/191 X |
| 4,304,521 | 12/1981 | Hammond | 414/276 X |

FOREIGN PATENT DOCUMENTS

| | | | |
|---|---|---|---|
| 535997 | 1/1957 | Canada | 108/51 R |
| 2251671 | 5/1973 | Fed. Rep. of Germany | 414/267 |
| 6403006 | 3/1964 | Netherlands | 52/236.3 |

Primary Examiner—James L. Ridgill, Jr.
Attorney, Agent, or Firm—Caesar, Rivise, Bernstein, Cohen & Pokotilow, Ltd.

[57] ABSTRACT

A storage facility preferably for palletized loads includes an elongate aisle along which a pallet-carrying vehicle is adapted to move. A plurality of multi-level pallet storage bays are located side-by-side along the aisle and extend laterally from the aisle for use in storing palletized loads. The levels of each storage bay are vertically aligned and are separated from each other by pallet-supporting floor sections; each bay being separated from its adjacent bay by a set of laterally spaced-apart vertically extending support members. Floor sections located between adjacent sets of vertically extending support members are removable for creating at least one laterally extending sub-aisle in communication with the elongate aisle, and the lateral spacing between at least two of the support members in a set of support members adjacent a sub-aisle provides an opening into the subaisle sufficiently large to permit removal of a pallet therethrough. In a preferred embodiment of this invention floor sections of the storage facility can be rotated to position either of the opposed sides in an upwardly facing orientation for supporting a palletized load thereon.

22 Claims, 11 Drawing Figures

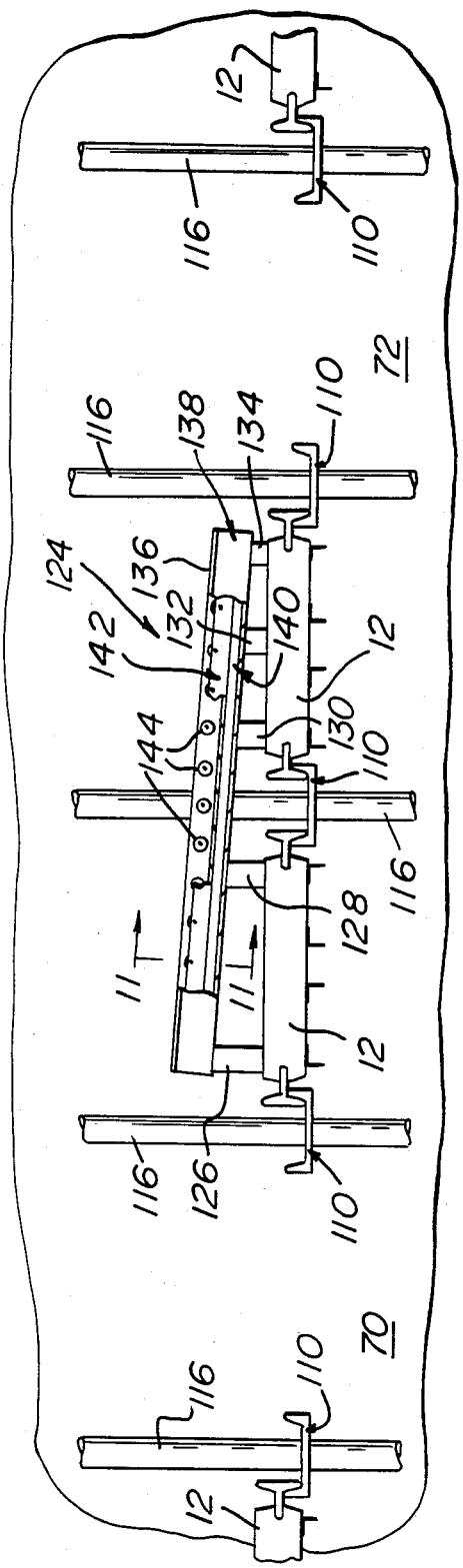
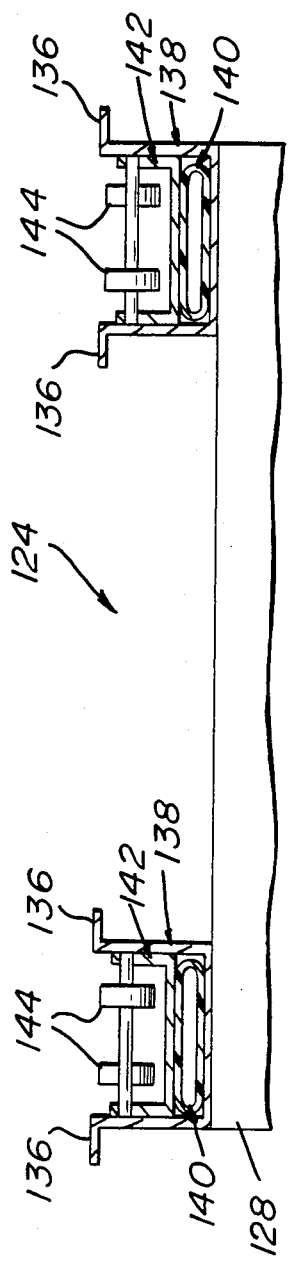
FIG.10
FIG.11

STORAGE FACILITY

FIELD OF THE INVENTION

This invention relates generally to a storage facility and more specifically to a storage facility for palletized loads which can be easily modified to provide for either low density storage of the type accommodating small quantity distribution therefrom, or high density storage of the type accommodating bulk storage therein.

BACKGROUND OF THE INVENTION

There are a number of different storage systems available for palletized loads; the particular system being dictated by the specific needs of the facility. For example, when small quantity distribution from a storage area is desired a conventional pickout rack system can be employed. This type of system generally includes multi-level storage bays which are either of the single-deep or double-deep type. These bays generally are positioned side-by-side along an aisle to permit easy access to the palletized loads in them. This type of storage facility employs a significant amount of aisle space to permit ready access to the palletized loads with the use of either a single reach or a double reach fork lift truck, depending upon whether the bays are of the single-deep or double-deep type.

While pick-out rack systems are ideally suited for facilities requiring small quantity distribution therefrom, they are highly undesirable for the bulk storage of palletized loads wherein high density storage is desired. Stating this another way, in bulk storage facilities it is not necessary or desirable to provide a large number of aisleways to access the palletized loads. The inclusion of a large number of aisleways takes away valuable space for the storage of articles, and this is highly undesirable for bulk storage facilities wherein only large volume distribution of palletized loads is required.

Drive-in or drive-thru storage systems are commonly employed for the high density, bulk storage of palletized loads. Unfortunately these systems are not sufficiently versatile to permit the easy distribution of small quantities of palletized loads therefrom.

Gravity-type storage systems also are designed for the bulk storage of palletized loads. These systems, like the drive-in and drive-thru systems, lack the desired versatility to permit the same easy distribution of small quantities of palletized loads that can be achieved with pick-out rack systems.

A typical gravity-type system is sold under the trademark Load Bank by Conveyor Logic Inc. of Dutton, Mich. This system employs a pneumatically actuated bag, or tube, for raising rollers in a "pulsing" manner to control the movement of the various pallets down inclined pallet-supporting rails located in vertically aligned storage sections. In addition to lacking the desired versatility for small-quantity distribution of the palletized loads, these gravity-type systems are quite expensive. In fact, they cost approximately five or six times more per pallet setting than drive-thru type systems.

One of applicant's present bulk storage facilities for palletized loads includes an elongate main aisle and a plurality of multi-level pallet storage bays located side-by-side along each elongate side of the main aisle. Ground level sections of the storage bays can be used as staging areas, if desired, and for this purpose are sufficiently wide to permit pallet trucks to be moved into them from the main aisle. However, the various floor section separating the different levels in each of the storage bays are firmly welded in place, and therefore do not provide for the easy modification of different sections of the facility from their high density bulk storage capability to a lower density storage capability of the pick-out type systems.

Another of applicant's storage facilities is a modified drive-in system designed only for the high density, bulk storage of palletized loads. In this facility a plurality of two-level storage bays are located side-by-side adjacent a main aisle along which a pallet-carrying vehicle is adapted to be moved. A plurality of floor sections are utilized in each storage bay to support palletized loads on the second level of each of said bays. The floor sections forming the second level of each bay are movable relative to each other in a horizontal plane to create a space between them into which a pallet-carrying member of a vehicle can be extended for depositing a palletized load on a floor section of the second level adjacent the space.

In operation the pallet-carrying vehicle can be driven into a ground level storage area of a bay with the pallet-carrying member thereof in a retracted position. When this carrying member is aligned with an opening between adjacent spaced-apart floor sections of the second level it can be extended to move the palletized load into the second level and deposit the load on a floor section adjacent the opening. Thereafter, the pallet-carrying member of the vehicle can be retracted and a floor section of the second level adjacent the opening moved to close that opening and, at the same time, create a new opening in the second level in a different area. Thereafter, the pallet-carrying member of the vehicle, with a new palletized load carried thereby, can be extended through the newly created opening to deposit the new load on a different floor section of the second level. The procedure can be repeated to completely load the second level.

In order to completely load the ground level and second level of each bay palletized loads are first loaded on both levels at the rearmost region of the bay. Thereafter the pallets are progressively loaded on both levels in a direction approaching the main aisle.

In the facility described in the preceding paragraph the floor sections forming the second level of the various storage bays are not removed to create any sub-aisle. Moreover, even if sub-aisles were created the palletized loads would still only be removable from the openings at the front of the bays facing the main aisle because the lateral spacing between vertical support members forming the sides of the bays are too close to each other to permit removal of palletized loads from between them.

In summary, the prior art pallet storage facilities lack versatility, and in some cases are excessively expensive. They either are designed for their pick-out capability to permit small quantity distribution therefrom, in which case the required aisle space makes the facility undesirable for the bulk storage of palletized loads. Alternatively, in facilities designed for their bulk-storage capability the number of aisles is kept to a minimum, thereby making them unsuitable for use when small quantity distribution is desired.

From the above discussion it should be apparent that a need exists for a versatile and economical pallet storage facility which can be modified easily for either high density bulk storage of palletized loads or small quantity distribution of palletized loads depending upon the user's particular needs.

OBJECTS OF THE INVENTION

It is a general object of this invention to provide a versatile storage facility particularly designed for storing palletized loads.

It is a further object of this invention to provide a versatile storage facility which can be modified easily to permit either efficient small quantity distribution of palletized loads or efficient high density bulk storage of palletized loads, as desired.

It is a further object of this invention to provide a storage facility wherein selected areas can be modified to easily permit either small quantity distribution of palletized loads therefrom or high density bulk storage of palletized loads therein.

It is a further object of this invention to provide a storage facility in which storage bays for palletized loads are assessable from both the front and side to permit removal of the loads from more than one area of various bays.

SUMMARY OF THE INVENTION

The above and other objects of this invention are achieved in a storage facility for palletized loads having an elongate aisle along which a pallet-carrying vehicle such as a fork lift truck is adapted to move. A plurality of multi-level storage bays are located side-by-side along at least one side of the elongate aisle and extend laterally from the aisle. Each bay has a lateral dimension capable of receiving at least five laterally aligned pallets on each level which is used to store palletized loads, and an opening communicating with the elongate aisle through which the palletized loads on each such level can be removed. The levels of each storage bay are vertically aligned and are separated from each other by pallet-supporting floor sections. Moreover, each bay is separated from its adjacent bay by a set of laterally spaced-apart, vertically extending support members. Floor sections located between adjacent sets of the vertically extending support members are removable for creating at least one laterally extending sub-aisle located between the adjacent sets of vertical support members and communicating with the elongate aisle. The lateral spacing between at least two of the support members in a set of support members adjacent to a sub-aisle provides an opening communicating with the sub-aisle through which palletized loads can be removed.

In accordance with a further aspect of this invention a pallet storage facility includes rotatable floor sections having pallet-supporting surfaces on the opposed sides thereof. Connecting means associated with vertical support members and the rotatable floor sections are provided for connecting the floor sections to the support members with either of the opposed sides facing upwardly to support pallets thereon. In the most preferred embodiment of this invention the pallet-supporting means on one side of the rotatable floor sections differ from the pallet-supporting means on the opposed side of said floor sections.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 10 is an enlarged fragmentary side elevational view of a section of the storage facility of this invention employing an insert, having parts broken away to show details of construction, to establish a gravity feed arrangement providing first-in, first-out capability for palletized loads; and FIG. 11 is an enlarged fragmentary sectional view taken along line 11—11 of FIG. 10.

DESCRIPTION OF THE PREFERRED EMBODIMENTS OF THE INVENTION

Figure 1:
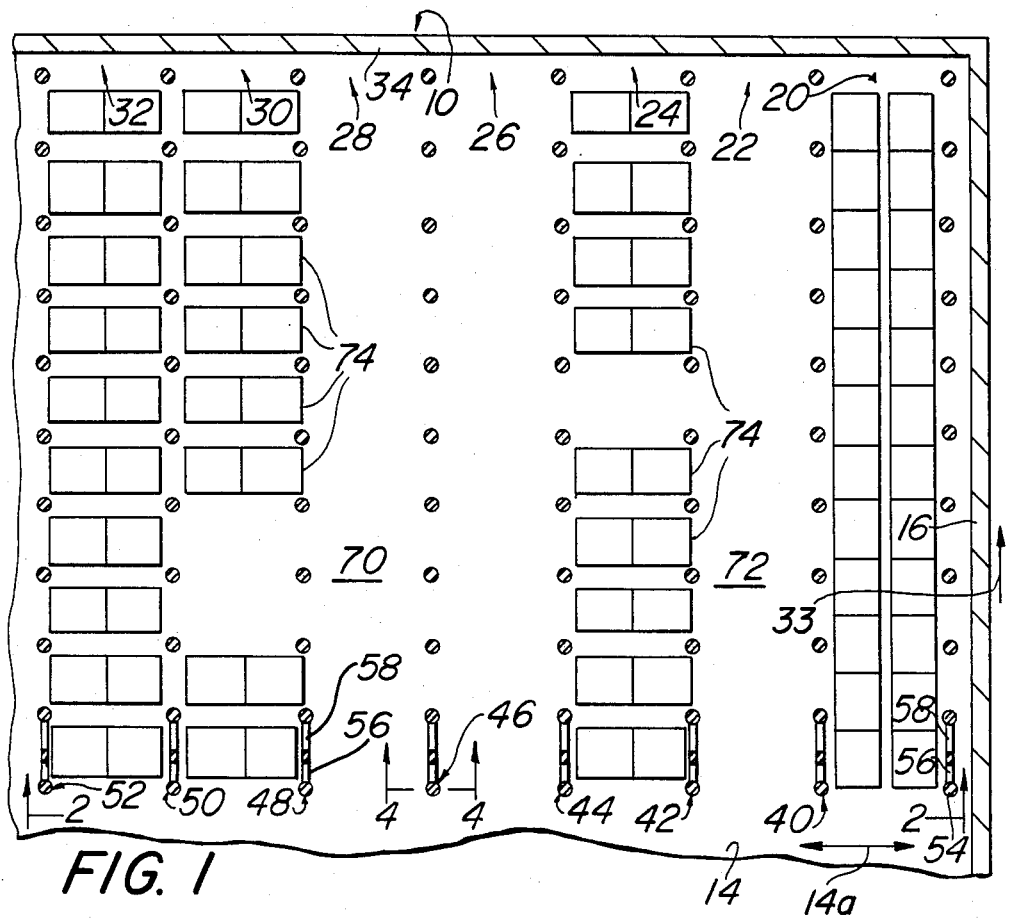
FIG. 1 is a fragmentary diagrammatic a view of a storage facility in accordance with this invention taken along line 1—1 of FIG. 2.
Figure 2:
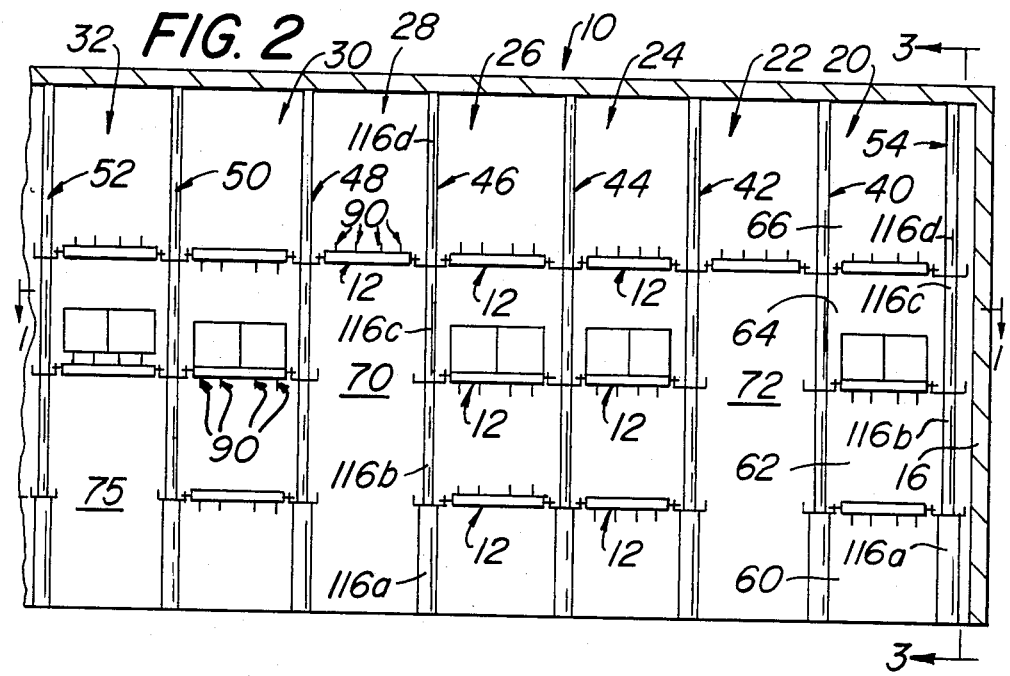
FIG. 2 is a side elevational view of the storage facility taken along line 2—2 of FIG. 1 but showing the entire height of the storage facility.

Referring now in greater detail to the various figures of the drawings wherein like reference characters refer to like parts, a pallet storage facility embodying the present invention is generally shown at 10 in FIGS. 1 and 2. The storage facility 10 basically comprises removable and rotatable pallet-supporting floor sections 12 located adjacent an elongate main aisle 14 to permit the easy modification of the storage facility to accommodate different storage requirements.

Figure 3:
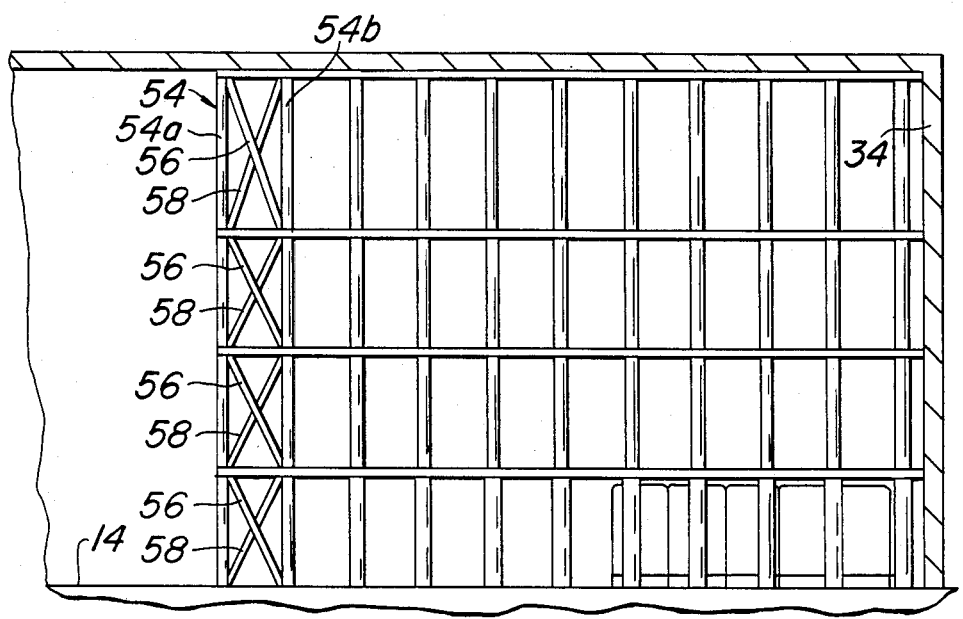
FIG. 3 is a front elevational view of the storage facility taken along line 3—3 of FIG. 2.

Referring to FIGS. 1-3 the elongate main aisle 14 extends from a front wall 16 to a rear wall (not shown) of the facility 10 in the direction of double-headed arrow 14a (FIG. 1). A plurality of multi-level pallet storage bays 20, 22, 24, 26, 28, 30 and 32 extend laterally from the main aisle 14 in the direction of arrow 33, and terminate adjacent a side wall 34 of the facility. It should be understood that the number of bays can be varied within wide limits, and that seven bays are actually shown in FIGS. 1 and 2 for purposes of illustrating the various unique features of this invention.

The arrangement of laterally extending storage bays illustrated in FIG. 1 can be repeated on the opposite side of the main aisle 14. In fact, in the preferred embodiment of this invention the main aisle 14 actually is located in the center of the facility with laterally extending storage bays located side-by-side along each of the elongate sides of said main aisle.

The various storage bays illustrated in FIGS. 1–3 are positioned side-by-side along one elongate side of the main aisle 14. These bays are separated from each other by spaced-apart sets of vertically extending support members 40, 42, 44, 46, 48, 50 and 52. The support members in each set are laterally spaced-apart from each other and, when referred to individually, are identified with the same numeral as the set, but with a letter of the alphabet utilized as a suffix.

As can be seen best in FIGS. 1 and 3 a set of vertically extending laterally spaced-apart support members 54 also is provided adjacent the front wall 16 of the facility, but this set does not function to separate the bin 20 from any adjacent bin. However, in order to add stability to the storage facility 10 a plurality of bracing cross-bars 56 and 58 are welded to the adjacent sections of the two vertical support members 54a and 54b most closely adjacent the main aisle 14, as well as to the adjacent sections of the two vertical support members of the sets 40, 42, 44, 46, 48, 50 and 52 that are most closely adjacent to said main aisle. These bracing members will not interfere with the introduction or removal of palletized loads from the bays because palletized loads aligned with such cross-bars are easily accessible from the main aisle 14 with conventional pallet loading and removal equipment.

If desired bracing members identical or similar to cross-bars 56 and 58 can be employed to interconnect all of the adjacent vertical support members making up the set 54 to thereby add significant rigidity to the overall structure. In fact this same arrangement of crossing brace members can be utilized to interconnect adjacent vertical members disposed around the entire outer periphery of the storage facility, if desired, without interfering in any way with the positioning of palletized loads in the various bays of the facility and the removal of such loads therefrom.

Although each of the bays of the storage facility 10 illustrated in the drawings includes four storage levels 60, 62, 64 and 66 (FIG. 2), the number of such levels can be varied. However, to provide the desired bulk storage capability a facility including at least three levels is preferred.

As can be seen best in FIG. 2 the provision of removable and rotatable floor sections 12 permits a great deal of versatility in modifying the storage facility depending upon the particular storage capabilities that are required. In the illustrated embodiment the removable floor sections separating the first level 60 from the second level 62 and separating the second level 62 from the third level 64 in the bays 22 and 28 have been removed to thereby convert these storage bays into sub-aisles 70 and 72 extending laterally from the main aisle 14. In the illustrated embodiment the sub-aisles 70 and 72 are three-levels high and are capable of accommodating a pallet-removing fork lift truck therein. It should be noted that one of the highly advantageous features of this invention is that sections of the storage facility can be modified by removing or rotating empty floor sections 12 without the need for removing palletized loads that might be located on vertically or horizontally adjacent floor sections.

In a facility having four or more levels it is preferred to weld at least the top floor section of the various bays to the vertical support members (or connecting members associated with the vertical support members) because these higher levels most preferably are utilized solely for bulk storage, and therefore do not require the conversion flexibility achievable with removable floor sections. By welding the top floor sections in place added rigidity also is imparted to the facility 10.

As can be seen best in FIGS. 1 and 2 each of the laterally extending bays are of the double-width type (i.e. they are sufficiently wide to accommodate two rows of palletized loads side-by-side with each load being approximately four feet wide). When the floor sections 12 are removed to convert storage bays into sub-aisles the double-width dimension of the converted bays provides adequate room for maneuvering a fork lift truck so that the forks thereof can be inserted easily into the sides of pallets supported (or to be supported) on the floor sections adjacent the sub-aisles. This permits the palletized loads to either be unloaded or loaded through openings in the sides of the storage bays that communicate with the sub-aisles. It should be apparent that in order to permit movement of palletized loads into and out of storage bays adjacent a sub-aisle the laterally spaced apart vertical support members in each of the sets adjacent a sub-aisle (e.g., sets 40 and 42 adjacent sub-aisle 72) are sufficiently far apart to permit the palletized loads to be removed from between them. This is clearly illustrated in FIG. 1 wherein the lateral dimension of the palletized loads 74 located adjacent each of the sub-aisles 70 and 72 is less than the lateral spacing between adjacent vertical support members adjacent these sub-aisles.

The storage facility 10 of this invention has a great deal of versatility. For example, it can be modified to include sub-aisles of varying height where desired. An example of this versatility is illustrated in FIG. 2 wherein the storage bay 32 has been converted to form a two-level sub-aisle 75 and the storage bays 22 and 28 have been converted to three-level sub-aisles 72 and 70, respectively.

As can be seen best in FIG. 2 each of the removable and rotatable floor sections 12 located between the sub-aisles 70 and 72 is oriented with the side including upstanding rails facing downwardly and the opposite side free of such rails facing upwardly. As a result of this arrangement the forks of conventional fork lift trucks can be moved into supporting engagement with a pallet from either of the sub-aisles 70 or 72 without encountering interference from any upstanding rails. However, the side of the floor sections 12 including the rails preferably is employed to support rows of palletized loads that either are loaded onto or removed from the floor sections from the main aisle 14, as will be explained in greater detail hereinafter. However, from the above explanation and as is clearly shown in the drawings it is apparent that the pallet-supporting means on one side of each rotatable floor section 12 differs from the pallet-supporting means on the opposite side of each rotatable section.

Figure 7:
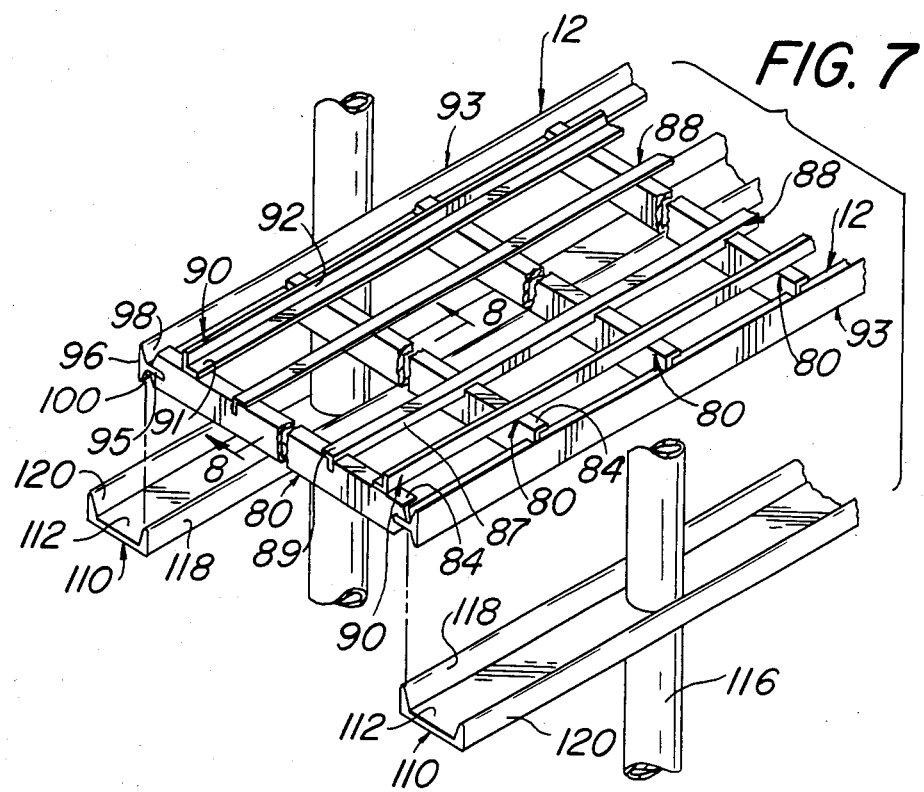
FIG. 7 is a fragmentary isometric view of a floor section and associated connecting means for retaining the floor section to vertical support members of the storage facility.
Figure 8:
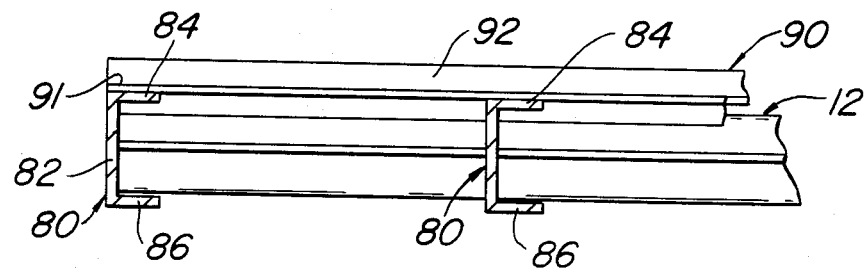
FIG. 8 is a sectional view taken along line 8—8 of Fig. 7.
Figure 9:
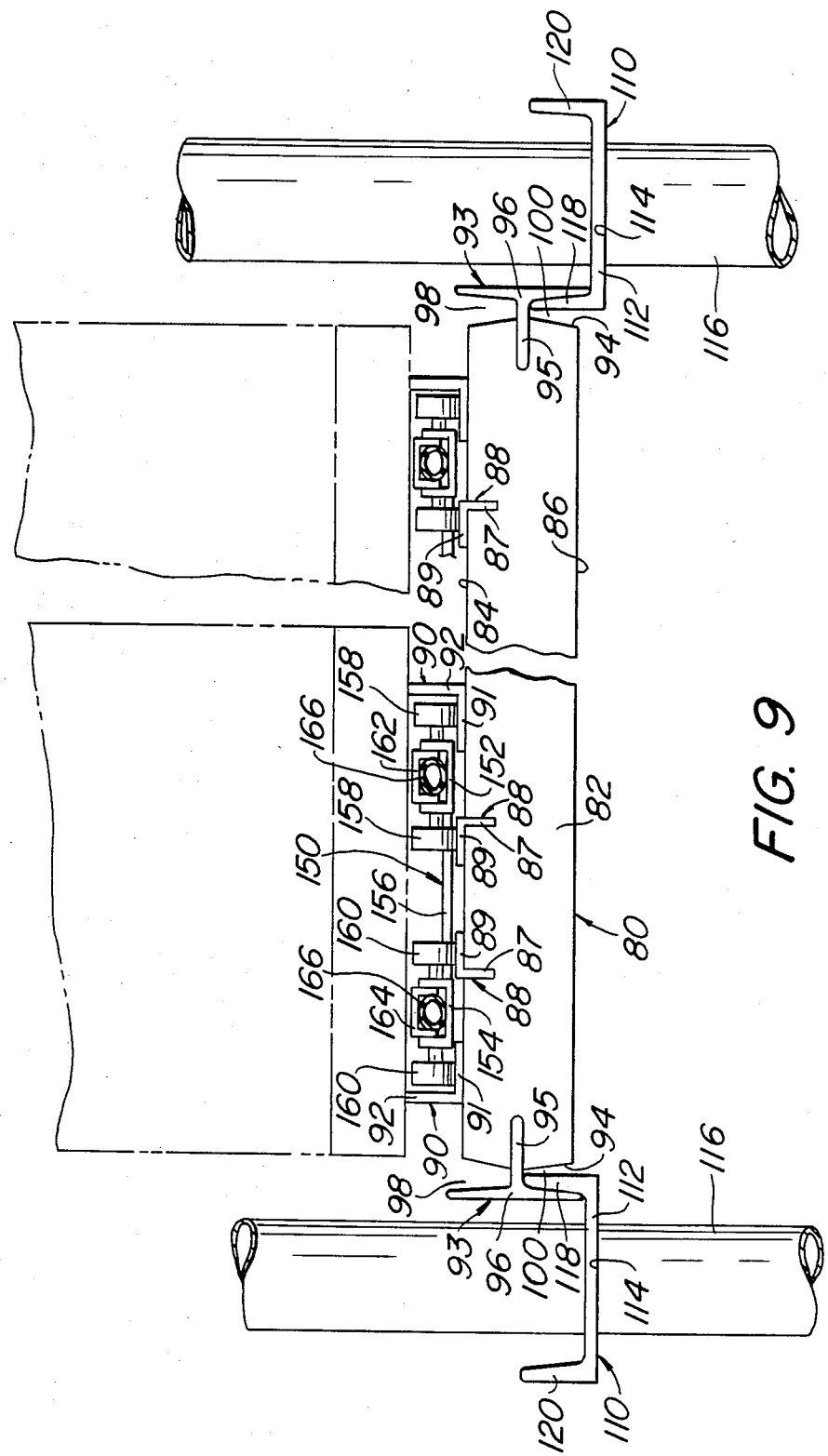
FIG. 9 is an elevational view showing a carriage positioned beneath a palletized load for lifting and moving the load relative to a floor section of the storage facility.

Referring to FIGS. 7–9 a unique removable and rotatable floor section 12 in accordance with this invention is formed by a plurality of laterally spaced apart channel members 80 (e.g. 4 inch channel members). Each of the channel members 80 includes a central base or web 82 provided with opposed upper and lower legs 84 and 86. Four angle irons 88 are disposed in pairs and extend laterally to bridge these channel members 80. Two of the angle irons 88 are shown in FIG. 7 and three are shown in FIG. 9. Each of the angle irons 88 includes a vertical leg 87 welded into slots extending through the upper legs 84 and a portion of the bases 82, and a horizontal leg 89 engaging the upper surface of each of the legs 84 and providing a supporting rail for rollers of a pallet-conveying carriage to be described hereinafter. If desired, a suitable catwalk (not shown) can be included on the floor sections, such as by welding it to the outwardly directed surfaces of the upper and lower legs 84 and 86 of the channel members 80, to provide an area along which an individual can walk.

Referring to FIGS. 2 and 7 through 9 each of the rotatable floor sections also includes four laterally extending angle irons 90 provided with horizontal legs 91 welded to the upper legs 84 of the channel members 80 and vertically extending legs 92 adapted to support palletized loads above the upper flat surfaces of the legs 84 (FIG. 9). These vertically extending legs constitute pallet-supporting means which differ from pallet-supporting means on the opposite surface of the floor sections. Specifically, the opposite surface of the floor section 12 is substantially planar, and actually is formed by the outwardly facing surfaces of the lower legs 86 of the channel members 80, as can be seen best in FIG. 8. It should be noted that the adjacent channel members 80 are sufficiently close together to support the palletized loads without fear that such loads will slip through the spaces between the channel members.

Referring to FIGS. 7 and 9 the construction of each of the removable and rotatable floor sections 12 is completed by first connecting means in the form of T-shaped beams 93 extending outwardly from opposed laterally extending ends 94 of the channel members 80. These T-shaped beams include a stem 95 welded to adjacent surfaces of slots provided in the opposed ends 94 of the various channel members 80. Each of the beams further includes a head section 96 that cooperates with a segment of the stem 95 and adjacent ends 94 of the channel members 80 to form opposed slots 98 and 100 that open in opposite directions from each other. These opposed slots constitute connecting means for permitting the rotatable floor sections 12 to be supported with either of their pallet-supporting surfaces facing upwardly, depending upon the particular requirements of the storage facility. Although the T-shaped beams 93 are shown as extending continuously along each laterally extending side of the floor section, it should be understood that a plurality of discrete, laterally-spaced-apart beams of a similar T-shaped configuration could be provided. For example, it may only be necessary to provide 3 or 4 of such spaced-apart beams along each lateral side of the floor sections to provide the required support.

Still referring to FIGS. 7 and 9 second connecting means adapted to cooperate with the slots 98 and 100 of the first connecting means 93, located at the ends of the removable and rotatable floor sections 12, include upwardly directed channel members 110 (e.g. six inch channel members) including a central base or web 112 welded to the upper surface 114 of lower vertical sections 116 of the various vertically extending support members. Each of the channel members 110 includes opposed legs 118 and 120 which constitute cooperable connecting means in the form of upwardly directed projections receivable within either the slots 98 or slots 100 at the ends of the floor sections 12, when said floor sections bridge the space between adjacent sets of vertically extending support members depending upon which side of the removable floor sections are to be positioned upwardly.

Most preferably the connecting members are designed and positioned so that the head sections 96 of the T-shaped beams 93 are positioned closely to the inwardly facing surfaces of the channel leg sections 118 or 120 of a channel member 110 to provide a non-wobbley support for the removable and rotatable floor sections 12. However these closely positioned surfaces should not provide a tight frictional connection to prevent their easy separation, as is desired when a floor section is to be removed and/or rotated.

The orientation of the floor section 12 illustrated in FIG. 9, with the legs 92 of the angle irons 90 facing upwardly, preferably is the orientation that is employed to support palletized loads for removal or insertion through a front opening adjacent the main aisle 14. In the illustrated embodiment each of the storage bays has a depth of approximately 10 pallet-lengths (i.e. approximately 40 feet), and therefore a pallet-supporting carriage (to be described hereinafter) needs to be used to actually convey palletized loads to a location adjacent the main aisle 14 for removal or toward the rear of the bays for storage. The precise manner in which such a carriage cooperates with the palletized loads will be discussed later.

When palletized loads are to be removed or loaded from a sub-aisle the upwardly projecting legs 92 of the angle irons 90 can provide an undesirable, interfering abutment. Most preferably when the storage facility 10 is set up to remove palletized loads from a sub-aisle (e.g. 70, 72) the floor sections 12 supporting these loads are rotated from the orientation illustrated in FIG. 9 to an orientation in which the pallet-supporting surface is provided by the outwardly facing surfaces of the lower legs 86 of the channel members 80. Stating this another way, the side of the various floor sections including the angle irons 90 is positioned downwardly so that these angle irons will not interfere with the loading or unloading of palletized loads from a sub-aisle.

It also is within the scope of this invention to provide a removable pallet conveying system that can be supported by the floor sections 12 located between the sub-aisles to assist in actually moving the palletized loads from a position adjacent one sub-aisle to a location adjacent the other sub-aisle. Such an arrangement provides a first-in, first-out pallet storage arrangement.

Referring specifically to FIGS. 10 and 11 a unique use of the storage facility of this invention is illustrated wherein a section of the facility between sub-aisles 70 and 72 is modified to include a removable pallet conveying system 124 for providing a gravity-type feed system. The use of the system 124 provides first-in, first-out capability for palletized loads similar to a Load Bank gravity system sold by Conveyor Logic, Inc. of Dutton, Mich., as described earlier in this application.

Referring specifically to FIG. 10 the removable pallet-conveying system 124 is positioned on an upwardly facing surface of a removable floor section 12 between spaced-apart sub-aisles 70 and 72, respectively. The support 124 is illustrated as including a plurality of spaced-apart support legs 126, 128, 130, 132 and 134 of a gradually diminishing height, as viewed in a direction from the sub-aisle 70 to the sub-aisle 72. This arrangement of support legs orients the upper pallet supporting surfaces 136 of the system 124 along a downwardly inclined plane in a direction from the sub-aisle 70 to the sub-aisle 72 to thereby provide a gravity-type system for palletized loads supported on said surfaces 136.

As can be seen best in FIG. 11 the pallet supporting surfaces 136 are provided by upper surfaces of the legs of spaced-apart, outer U-shaped channel members 138.

An inflatable tube 140 is supported adjacent the base of each of the channel members 138, and an inner channel member 142 carrying pallet conveying means in the form of rotatable, pallet-engaging rollers 144 is then supported for reciprocating movement on each of the inflatable tubes.

The inflatable tubes are hooked up to a source of pressurized air (not shown) through a suitable valve means. This valve can be actuated in a conventional manner to "pulse" the system, similar to the earlier-referenced Load Bank system, to thereby intermittently convey the palletized loads from a location adjacent sub-aisle 70, whereat the loads are placed on the supporting surfaces 136, to a location adjacent the sub-aisle 72, whereat the loads are removed from said surfaces. Specifically, prior to inflating the tubes 140 the rollers 144 are located below the upper pallet-supporting surfaces 136. In this position the frictional resistance between the pallets and the pallet-supporting surfaces 136 is sufficient to prevent movement of the palletized loads along the downwardly inclined plane of the supporting surfaces 136. When it is desired to move a palletized load toward the sub-aisle 72 the pneumatic system is pulsed to inflate the tubes 140, and thereby move the rollers 144 carried by the inner channel members 142 to a position projecting above the pallet-supporting surfaces 136. In this position the palletized loads will be lifted off of the supporting surfaces 136 and carried toward the sub-aisle 72 by rotation of the rollers 144 until the inflatable tubes again are collapsed. Upon collapsing of the tubes the inner channel members 142 will move into the outer U-shaped channel members 138 to cause the palletized loads to again come to rest on the pallet-supporting surfaces 136. This procedure is repeated intermittently to effect movement of the palletized loads from sub-aisle 70 to sub-aisle 72.

It should be understood that different types of removable pallet-conveying systems can be employed in conjunction with the floor sections 12 to positively convey palletized loads between adjacent sub-aisles. For example, powered conveyor systems of the general type shown in U.S. Pat. Nos. 3,620,353 (Foster et al) and 3,930,573 (Wyman) can be made as removable support systems for positioning on the upwardly facing surfaces of the removable floor sections 12.

Referring to FIG. 2 a unique construction of the vertical support members employed in the storage facility 10 is illustrated and will now be described. Each of the vertical support members employed in the various sets includes four separate vertical sections 116a, 116b, 116c and 116d. The three uppermost sections (116b, 116c and 116d) all have substantially the same diameter, but are of a lesser diameter, and therefore include less material, than the bottom sections 116a. The bottom sections 116a are formed to have a greater load carrying capacity, or rating, because they are required to support the greatest load by virtue of being on the bottom of the vertical columns. Although in the illustrated embodiment the bottom sections do have a greater diameter than the remaining sections, this is not necessarily required in order to establish the greater load carrying capacity. For example, the bottom sections 116a could be made of the same diameter as the upper sections 116b, 116c and 116d, but from a material having a greater load carrying capacity than said upper sections.

In order to assemble the storage facility of this invention the various bottom sections 116a are first attached to the floor. However these bottom sections usually are part of prefabricated units, each including an upwardly facing U-shaped member 110 welded to upper surfaces of laterally spaced-apart bottom sections 116a. In other words, the laterally spaced-apart bottom sections in each set of vertical supports are fixed to respective laterally extending U-shaped channel members 110 to form prefabricated building units which then are attached to the floor.

Figure 4:
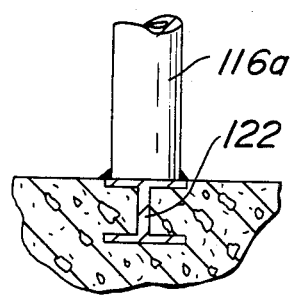
FIG. 4 is a sectional view taken along line 4—4 of FIG. 1 illustrating one arrangement for connecting vertical support members of the storage facility to a floor.

In new constructions, as is illustrated in FIG. 4, I-beams 122 are cemented into the floor during actual construction of the facility to provide the supporting member to which the various bottom sections 116a of the prefabricated units are welded.

Figure 5:
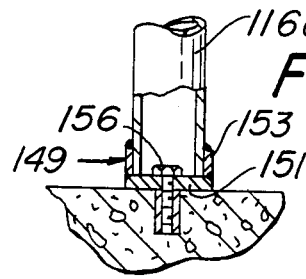
FIG. 5 is a view similar to FIG. 4 but illustrating a different arrangement for securing vertical support members of the storage facility to a floor.
Figure 6:
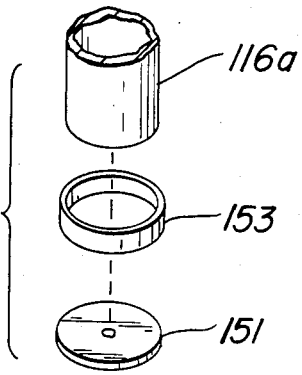
FIG. 6 is an exploded isometric view of the elements illustrated in FIG. 5.

Referring to FIGS. 5 and 6, in pre-existing facilities which are to be modified in accordance with this invention cup-shaped members 149 for receiving the bottom sections 116a of the vertical support members 116 are each formed by a metal plate washer 151 (e.g. a ⅜ inch washer) welded to an annular metal segment 153. Each of the plate washers 152, in turn, is connected to the floor with a bolt 156 at a location where a vertical support member is to be located. The lower sections 116a of the prefabricated building units are then inserted into the cup-shaped members 149 and welded to the annular metal segments 153 thereof.

The mounting arrangements illustrated in FIGS. 4–6 support the spaced-apart vertical support members without providing projections bridging the lateral space between them that could impede the loading and/or removal of palletized loads through side openings in the bays from sub-aisles of the facility.

Once the lower sections 116a are firmly secured to the floor the various floor sections 12 dividing the first, or floor, level of each bay from the second level are then connected to the channel members 110 through the earlier-described cooperating connecting means on the floor sections 12. The individuals fabricating the facility then can employ these connected floor sections as a scaffold to support them as they secure the next adjacent vertical sections 116b, with channel members 110 welded to upper surfaces thereof, to the upwardly facing surface of the central base 112 of the various channel members 110 secured to the lower sections 116a. This same procedure is then repeated to interconnect each of the remaining vertical sections (e.g. 116c and 116d) and the intermediate channel members 110.

By forming the various vertical support members from separate sections, as described above, it is possible to employ the strongest load carrying members in the regions where they are needed, and lighter, generally less costly load-carrying members in other regions in which a lower load-carrying strength is accept- able.

As can be seen most clearly in FIGS. 2 and 3 the overall construction of the storage facility 10 is further strengthened by virtue of the fact that the various vertical support members are interconnected with the floor and ceiling of the facility. Although this precludes the rearrangement or relocation of the vertical support members to adjust the dimensions of the various storage bays, applicant's facility is still exceedingly versatile due to the unique arrangement of elements of the facility 10.

When the storage facility 10 is intended to be used for the high density bulk storage of palletized loads the number of sub-aisles preferably is kept to a minimum. In fact, for some applications it may be desirable to eliminate all of the sub-aisles to thereby maximize the storage area of the facility. When sub-aisles are eliminated (or not created) the palletized loads will be stored in the various bays for removal from the main aisle 14. Most preferably these bays have a lateral dimension capable of supporting at least five palletized loads in a row. In the most preferred embodiment of this invention the lateral dimension of the bays is approximately 40 feet and is capable of supporting a row of ten palletized loads, each having a lateral dimension of 4 feet.

When palletized loads are stored for removal only from the main aisle 14 the removable floor sections 12 preferably are positioned with the angle irons 90 spaced upwardly as illustrated in FIG. 9. With the floor sections so positioned two rows of palletized loads are supported side-by-side in each bay with the palletized loads in each row being supported on the upper surfaces of laterally spaced-apart vertical legs 92 of adjacent angle irons 90. In this manner the palletized loads are supported above the upper surfaces of the legs 84 of the channel members 80.

In order to remove the various palletized loads from openings in the bays adjacent the main aisle 14 it is necessary to first move these loads adjacent to the main aisle 14 so that a fork lift truck or similar pallet-carrying vehicle can engage the pallets thereof. To accomplish this result a number of different pallet-conveying carriages can be employed.

A typical pallet-conveying carriage usable in this invention is illustrated at 150 in FIG. 9. This carriage generally has a length equal to the lateral dimension of a single palletized load, which commonly is four feet. The carriage 150 includes spaced-apart upwardly directed U-shaped channel members 152 and 154 interconnected to each other by suitable bracing members, one of which is illustrated at 156. It should be understood that any number of braces 156 can be employed, and that they can be arranged in various ways to provide the necessary rigidity to the carriage. A set of wheels 158 is provided along each elongate side of the channel 152, and these wheels are supported upon the horizontal leg 91 of one of the angle irons 90 and an adjacent horizontal leg 89 of an adjacent angle iron 88. A second set of wheels 160 is mounted on each side of the channel 154, and these wheels are supported on the horizontal legs of adjacent angle irons 90 and 88.

Downwardly facing channel members 162 and 164 are telescopically received within the members 152 and 154, and an expandable bladder 166 is positioned between these telescoping channel members. The expandable bladders 166 are connected to a suitable source of pressurized air through a conventional valve (not shown) to permit them to be expanded and contracted. Expansion of the bladder will move the inner channel members 162 and 164 upwardly to engage the overlying palletized load and lift it off of the vertical legs of the laterally adjacent supporting angle irons 90. The carriage 150 preferably is provided with a handle (not shown) for use in moving it and its supported palletized load forwardly to a location adjacent the main aisle 14 where the load can be removed with a conventional fork lift truck. This same carriage likewise can be utilized to load palletized loads into the various bays.

It should be apparent the storage facility 10 of this invention is extremely versatile. When high density bulk storage of palletized loads is required virtually all of the bays can be employed for storage purposes, with the removal of the palletized loads taking place through openings adjacent the main aisle 14 of the facility. With this arrangement a pallet-conveying carriage desirably is employed to assist in the loading and unloading of the palletized loads from the various bays.

When a pick-out storage system is desired one or more sub-aisles can be provided off of the main aisle to establish direct access to the various palletized loads in the bays adjacent the sub-aisles. This permits the small-quantity distribution of a variety of articles directly from the sub-aisles through the use of conventional pallet-carrying vehicles. Moreover, when palletized loads are intended to be removed from sub-aisles it is possible to orient the supporting floor sections with the side containing the pallet-supporting angle irons facing downwardly to thereby present a smooth, unobstructed supporting surface for the palletized loads.

Without further elaboration the foregoing will so fully illustrate my invention that others may, by applying current or future knowledge, adopt the same for use under various conditions of service.

I claim:

1. A storage facility for palletized loads including:
   (a) an elongate aisle along which a pallet-carrying vehicle is adapted to move;
   (b) a plurality of multi-level pallet storage bays located side-by-side along an elongate side of the aisle and extending laterally from said elongate side, each of said bays having a lateral dimension capable of receiving a row of at least five laterally aligned palletized loads on each level used for the storage of palletized loads;
   (c) the levels of each of said storage bays being vertically aligned and being separated from each other by pallet-supporting floor sections; each of said storage bays being separated from an adjacent one of said bays by a set of laterally spaced-apart, vertically extending support members, with support members of adjacent sets located adjacent the elongate aisle defining an opening communicating with the elongate aisle through which palletized loads can be removed by a person in said elongate aisle;
   (d) removable and replaceable floor sections including first connecting means at opposed sides thereof, each said removable and replaceable floor sections extending between and bridging adjacent sets of vertically extending support members of said storage bays and at least some of said removable and replaceable floor sections separating a floor level of a storage bay from an adjacent, vertically aligned level, said floor level being in the same plane as the elongate aisle;
   (e) second connecting means on said adjacent sets of vertically extending support members;
   (f) siad second connecting means cooperating with said first connecting means for removably connecting the removable floor sections to said adjacent sets of vertically extending support members permitting removal of the removable and replaceable floor sections bridging said adjacent sets of vertically extending support members to convert a pallet-supporting section of the storage facility into at least one laterally extending sub-aisle between said adjacent sets of vertically extending support members, at least one of said sub-aisles communicating with the elongate aisle and having an unobstructed vertical height from the floor level of at least two vertically aligned pallet receiving levels and having a width between adjacent sets of vertically extending support members sufficient for removing pallets supported on floor sections adjacent said at least one of said sub-aisles, said second connecting means also cooprating with said first connecting means for permitting reconnection of said removable and repalaceable floor sections to said adjacent sets of vertically extending support members for converting said sub-aisles into pallet-supporting sections; and
  (g) the lateral spacing between at least two of the support members in a set of laterally spaced-apart support members adjacent to a sub-aisle providing an unobstructed opening communicating with said sub-aisle that is sufficient large to permit removal of a palletized load therethrough.

2. The storage facility of claim 1 characterized in that the vertically extending support members are joined to the floor and roof of the facility.

3. The storage facility of claim 1 characterized in that an unobstructed opening between at least two of the laterally spaced-apart support members that is sufficiently large to permit removal of a palletized load therethrough is located at least three pallet-lengths from the elongate side of the elongate aisle.

4. The storage facility of claim 1 characterized in that the pallet storage bays include at least three levels separated from each other by removable pallet-receiving floor sections located at two different vertical levels for permitting the formation of sub-aisles having a height equal to at least three pallet-receiving levels.

5. The storage facility of claim 1 characterized in that vertically extending laterally spaced-apart support members include separate vertically aligned sections interconnected to each other through said second connecting means for removably connecting floor sections to the support members.

6. The storage facility of claim 5 characterized the lowermost section of the vertically extending support members has a greater load carrying capacity than the uppermost section of said support members.

7. The storage facility of claim 1 characterized in that removable floor sections are rotatable and include pallet-supporting surfaces on opposite sides thereof, said first and second connecting means being engagable for permitting connection of the rotatable floor sections to the support members with either of the opposed sides facing upwardly to support a pallet thereon.

8. The storage facility of claim 7 characterized in that pallet-supporting means on one side of the rotatable floor sections differ from pallet-supporting means on the opposed side of the rotatable floor sections.

9. The storage facility of claim 8 characterized in that the pallet-supporting means on one side of the rotatable floor sections are in the form of spaced-apart, laterally extending rails for supporting the pallets in a vertically spaced position from an underlying upwardly facing surface of the rotatable floor sections.

10. The storage facility of claim 8 characterized in that one side of the rotatable floor sections includes upstanding rails for supporting pallets thereon and the opposite side of said rotatable floor sections is free of upstanding rails, said one side facing upwardly in storage areas of the bays adjacent the elongate aisle for permitting removal of palletized loads from said one side of said rotatable floor sections by a person in said elongate aisle, and said opposite side facing upwardly in at least one pallet storage area adjacent each of said at least two sub-aisles.

11. The storage facility of claim 1 characterized by said first and second connecting means removably connecting floor sections to at least two different adjacent sets of vertically extending support members for permitting removal of floor sections to create at least two sub-aisles spaced from each other along the elongate side of the elongate aisle and extending laterally from said elongate aisle, said at least two sub-aisles so created having an unobstructed height from the floor level of at least two pallet-receiving levels the lateral spacing between at least two of the elongate support members in a set of support members adjacent to each of said at least two sub-aisles so created providing an unobstructed opening sufficiently large to permit removal of a palletized load therethrough.

12. The storage facility of claim 11 including pallet-conveying means removably supportable on floor sections located between adjacent sub-aisles spaced from each other along the elongate side of the elongate aisle, said conveying means including actuating means for conveying palletized loads from a position adjacent one of the adjacent sub-aisles to a position adjacent the other of the adjacent sub-aisles.

13. The storage facility of claim 12 wherein the pallet-conveying means includes pallet-supporting surface located along an inclined path from one adjacent sub-aisle to the other adjacent sub-aisle.

14. The storage facility of claim 11 characterized in that removable floor sections are rotatable and include pallet-supporting surfaces on opposed sides thereof, said first and second connecting means being engagable for connecting the floor sections to the support members with either of the opposed sides facing upwardly to support a pallet thereon, said rotatable floor sections beng located at least in regions adjacent the floor sections that are removable to permit the creation of said at least two sub-aisles.

15. The storage facility of claim 14 characterized in that pallet supporting means on one side of the rotatable floor sections differ from pallet-supporting means on the opposed side of said rotatable floor sections.

16. The storage facility of claim 15 characterized in that the pallet-supporting means on one side of the rotatable floor sections are in the form of spaced-apart, laterally extending rails for supporting the pallets in a vertically spaced position from an underlying, upwardly facing surface of the rotatable floor sections.

17. The storage facility of claim 15 characterized in that one side of the rotatable floor sections includes upstanding rails for supporting pallets thereon and the opposite side of said rotatable floor section is free of upstanding rails, said one side facing upwardly in storage areas of the bays adjacent the elongate aisle for permitting removal of palletized loads from said one side of said rotatable floor sections by a person in said elongate aisle, and said opposite side facing upwardly in at least one pallet storage area adjacent each of said at least two sub-aisles.

18. A storage facility for palletized loads including:
  (a) vertical support members;
  (b) a floor section having a pallet-supporting surfaces on opposite sides thereof and being rotatable for positioning either of said opposite sides facing upwardly, pallet-supporting means on one side of the floor section differing from pallet-supporting means on the opposite side of the floor section; and
  (c) connecting means associated with said support members and rotatable floor section for connecting the rotatable floor section to the support members with either of the opposite sides facing upwardly to support a pallet thereon, said connecting means including members adjacent opposed lateral ends of the floor section defining slots having a base intermediate the opposite sides of the floor section and opening outwardly in opposite directions toward said opposite sides of the floor section, and upwardly directed projections secured to the vertically extending support members for reception within downwardly opening slots formed by the members adjacent the opposed lateral ends of the floor section.

19. The storage facility or claim 18 characterized in that the pallet-supporting means on one side of the floor section is in the form of spaced-apart, laterally extending rails for supporting the pallet in a vertically spaced position from an underlying, upwardly facing surface of said floor section.

20. The storage facility of claim 18 characterized in that one side of the floor section includes upstanding rails for supporting pallets thereon and the opposite side of said floor section is free of upstanding rails.

21. The storage facility of claim 18 characterized in that the upstanding projections of the connecting means secured to the vertically extending support members support the floor section solely by gravity.

22. The storage facility of claim 18 characterized in that the upwardly directed projections secured to the vertically extending support members are located adjacent opposed lateral ends of the floor section and frictionally engage downwardly directed projections adjacent the downwardly opening slots formed by the members adjacent the opposed lateral ends of the floor section for tightly interconnecting, with said floor sections, vertically extending support member adjacent the opposed lateral ends of said floor sections.

* * * * *